(12) United States Patent
Buzanowski

(10) Patent No.: US 7,166,262 B2
(45) Date of Patent: Jan. 23, 2007

(54) CONTROL FOR AMMONIA SLIP IN SELECTIVE CATALYTIC REDUCTION

(75) Inventor: Mark A. Buzanowski, Whittier, CA (US)

(73) Assignee: Mitsubishi Power Systems, Inc., Lake Mary, FL (US)

( * ) Notice: Subject to any disclaimer, the term of this patent is extended or adjusted under 35 U.S.C. 154(b) by 168 days.

(21) Appl. No.: 10/254,751

(22) Filed: Sep. 25, 2002

(65) Prior Publication Data

US 2004/0057889 A1    Mar. 25, 2004

(51) Int. Cl.
*B01D 53/56* (2006.01)
(52) U.S. Cl. .................................. 423/239.1
(58) Field of Classification Search .............. 423/235, 423/239.1
See application file for complete search history.

(56) References Cited

U.S. PATENT DOCUMENTS

| | | | |
|---|---|---|---|
| 4,160,805 A | 7/1979 | Inaba et al. | 422/180 |
| 4,309,386 A * | 1/1982 | Pirsh | 422/177 |
| 4,842,834 A | 6/1989 | Burton | 423/235 |
| 5,104,629 A | 4/1992 | Dreschler | 423/239 |
| 5,252,298 A | 10/1993 | Jones | 422/172 |
| 5,478,542 A | 12/1995 | Chawla et al. | 423/235 |
| 5,510,092 A | 4/1996 | Mansour et al. | 423/239.1 |
| 5,603,909 A | 2/1997 | Varner et al. | 423/239.1 |
| 5,612,010 A | 3/1997 | Pandey et al. | 423/239.1 |
| 5,628,186 A | 5/1997 | Schmelz | 60/274 |
| 5,988,115 A | 11/1999 | Anderson et al. | 122/4 |
| 6,048,510 A | 4/2000 | Zauderer | 423/235 |
| 6,264,905 B1 | 7/2001 | Spokoyny | 423/237 |

FOREIGN PATENT DOCUMENTS

| | | |
|---|---|---|
| DE | 19727268 C1 * | 1/1999 |
| FR | 2796154 A1 * | 1/2001 |
| JP | 10263360 A * | 10/1998 |

* cited by examiner

*Primary Examiner*—Edward M. Johnson
(74) *Attorney, Agent, or Firm*—Pillsbury Winthrop Sha Pittman LLP

(57) ABSTRACT

A method of operating a selective catalytic reduction (SCR) system includes detecting at least one of an ammonia level and a nitrogen oxide level within a cross-sectional area of a chamber at a downstream end of a SCR catalyst. The cross-sectional area is divided into sections. Ammonia flow is automatically regulated from an ammonia distribution grid at an upstream end of the SCR catalyst based on at least one of the ammonia level and the nitrogen oxide level detected.

22 Claims, 11 Drawing Sheets

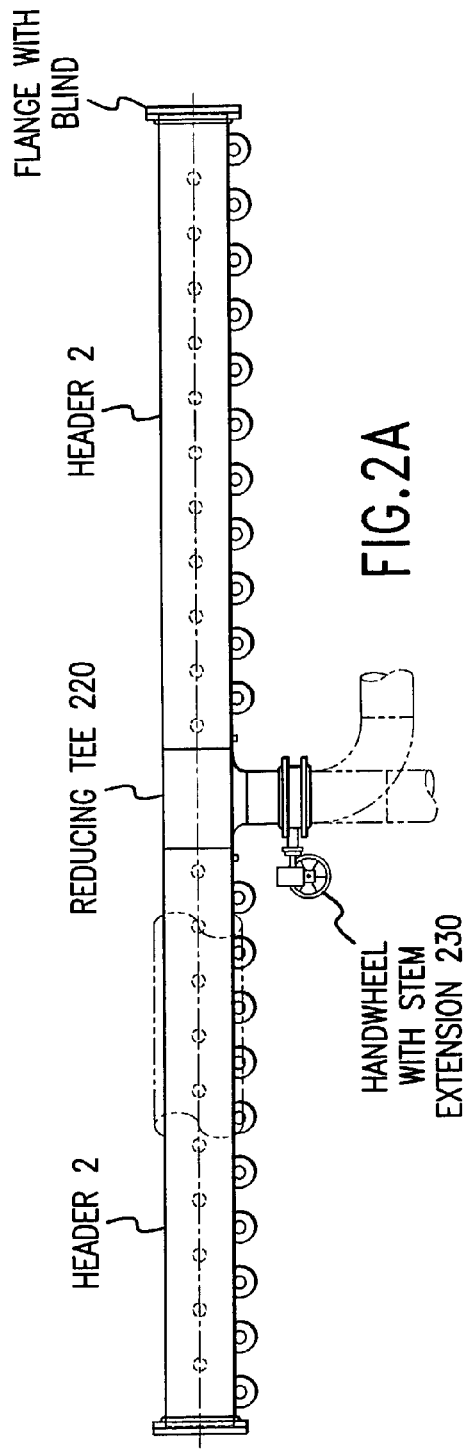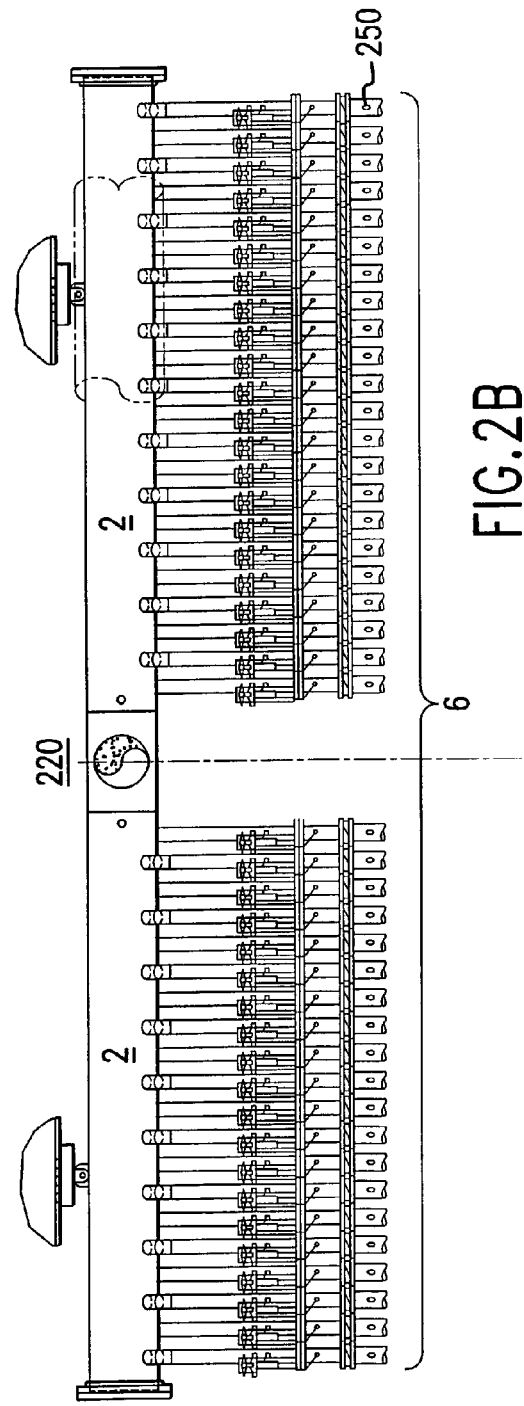

CONTROL FOR AMMONIA SLIP IN SELECTIVE CATALYTIC REDUCTION

BACKGROUND OF THE INVENTION

1. Field of the Invention

The present invention relates generally to a SCR system. More specifically, the present invention relates to real-time control of an ammonia distribution grid based on feedback information to provide a zero ammonia slip SCR system.

2. Discussion of the Related Art

The combustion of fossil fuels, such as coal, oil, and industrial or natural gas produces environmentally hazardous substances, including nitric oxide (NO) and nitrogen dioxide ($NO_2$). Nitric oxide and nitrogen dioxide are collectively called nitrogen oxide, or $NO_x$. In the normal combustion process of fossil fuels, the major portion of $NO_x$ is NO. The production of $NO_x$ can occur when fossil fuel is combusted in a variety of apparatuses, including refinery heaters, gas turbine systems, and boilers, such as in steam plants. The fuel may include coal, oil, gas, waste products, such as municipal solid waste, and a variety of other carbonaceous materials. Federal, state, and regional agencies have established regulations to limit $NO_x$ emissions from power plants and other sources.

To comply with governmental regulations, $NO_x$ emissions are regulated by combustion controls or utilizing post-combustion methods. The combustion control techniques include boiler tuning, utilization of low $NO_x$ burners and/or over-fire air, fuel staging, and other techniques aimed at suppressing $NO_x$ formation. These techniques are capable of 25 to 60 percent $NO_x$ reduction efficiency. However in many cases, governmental regulations or permits require higher NO removal efficiency. To accomplish such $NO_x$ emissions limits, post-combustion flue gas treatment methods have been commercialized. These methods include selective non-catalytic reduction (SNCR) and selective catalytic reduction (SCR) processes, combinations of the two processes, and other methods. Higher $NO_x$ removal efficiencies (80 to over 90 percent) are possible only when utilizing SCR technology.

Selective catalytic reduction (SCR) reactor technology is used to treat exhaust gases from an industrial process, such as energy production, before the gas is released into the atmosphere. The SCR reactor process relies on the use of a catalyst to treat the exhaust gas as the gas passes through the SCR reactor. Both $NO_x$ reducing agent and a catalyst reactor are required for the SCR process to proceed. Because the catalyst is an integral part of the chemical reaction, great effort is used to provide maximum exposure of the catalyst to the exhaust gas and to ensure that all the $NO_x$ comes sufficiently into contact with the catalyst and the reducing agent for treatment. In this technology, the SCR catalyst is placed in an optimum temperature window of typically between 550 to 750 degrees Fahrenheit. Because the $NO_x$ reducing agent is expensive and consumed in large quantities, new challenging problems need to be addressed concerning reagent utilization and its distribution. If the reducing agent is not entirely consumed in the SCR process, it may be released into the atmosphere. Such release increases the cost of the reagent consumption, resulting in non-optimal utilization of the reducing agent. In addition, governmental regulations limit quantities of the allowable reagent's release into the atmosphere. As a result, proper control of the SCR process requires strict control of both $NO_x$ and the reducing agent's release into the atmosphere.

There are a number of known $NO_x$ reducing agents. A commonly used $NO_x$ reducing agent is ammonia. The principal process for the removal of $NO_x$ from the flue gas flow is the injection of a reducing agent, such as ammonia, urea, or any of a number of other known reducing agents, into the flue gas flow. For example, the selective catalytic reduction of $NO_x$ involving the injection of ammonia ($NH_3$) into a flue gas flow in the presence of a catalyst occurs as the following chemical reactions:

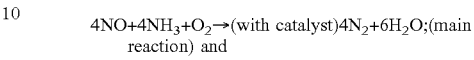

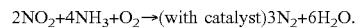

The main reaction proceeds over a catalyst layer within a temperature range of 600 degrees Fahrenheit to 750 degrees Fahrenheit. Major components of the catalyst include titanium dioxide ($TiO_2$) and vanadium pentaoxide ($V_2O_5$). Additionally, tungsten oxide ($WO_3$) and molybdenum trioxide ($MoO_3$) are added to increase thermal resistance and to limit the deteriorating effects of the catalyst's poisons. Proper selection and sizing of the catalyst volume are critical to achieve the required system performance. Catalyst volume is determined based on catalyst chemical activity, assumed catalyst deactivation rate, deviation of temperature and flue gas flow, and the molar ratio of $NH_3/NO_x$ across the catalyst bed cross section.

Ammonia, or its precursor, is needed to reduce $NO_x$ to innocuous nitrogen and water. According to the above main reaction equation, the reaction between NO and $NH_3$ is equimolar, that is, four molecules of ammonia are required to reduce four molecules of NO. A simple consequence of this reaction mechanism is that in case where more ammonia is supplied than the actual NO concentration, the difference between this oversupplied ammonia and NO leaves the SCR reactor with unreacted ammonia, called ammonia slip. In the reverse scenario, undersupply of ammonia causes NO to escape unreacted (non-reduced) from the SCR catalyst.

One method of injecting ammonia into a flue gas flow utilizes an external ammonia vaporization system in which liquid ammonia (either in anhydrous or aqueous state) is vaporized in a heater or vaporizer, utilizing hot air or flue gas as a carrier gas in the aqueous ammonia case, and then routed to a distribution/injector grid for injection into the flue gas flow at a location "upstream" of an SCR reactor. Because anhydrous ammonia is toxic and hazardous, the general practice is to use a mixture of ammonia and water ($NH_3 \cdot H_2O$). Ammonia diluted with water, i.e., aqueous ammonia, is less hazardous than anhydrous ammonia.

An ammonia injection grid (AIG) is typically utilized to inject vaporized ammonia into the SCR reactor. Because of the desire in the conventional art to inject a homogenous mixture of flue gas and ammonia into the SCR reactor, the ammonia injection grid is usually located immediately "upstream" from the SCR catalyst reactor (see FIG. 4). In addition to locating the ammonia injection grid immediately before the SCR catalyst reactor, the ammonia injection grid is equipped with jet injectors to further ensure that the ammonia vapor is adequately and evenly distributed across a cross-sectional area, or face, of the catalytic reactor chamber of the SCR system.

With respect to the SCR process, one school of thought is based on the assumption that perfect mixing of all the flue gas components and evenly injecting ammonia would maximize SCR performance. According to this idea, deviations of the $NH_3/NO_x$ ratio, temperature, and flue gas flow as expressed by a root mean square (RMS) are minimized by initiating some form of mixing process of the flue gas components. However, mixing has a limited effect on reducing flow deviation.

One of the problems related to the usage of an ammonia injection grid is the plugging of the holes (on the grid itself or on the injectors) by the formation of ammonia salts that may occur during operation of the SCR system. To prevent this plugging from disrupting the operation of the SCR system, the diameters of each of the injector holes are typically made to be larger than 3/16 inches. However, larger-sized holes means that fewer holes may be placed in the same area along the pipes of the ammonia injection grid, which reduces the control of the adjustment and distribution of the ammonia injection.

Another problem related to conventional ammonia injection grids utilized in SCR systems is the occurrence of ammonia slip. Ammonia slip occurs when the ammonia that is used as the reducing agent passes through the SCR system un-reacted. Ammonia slip is particularly undesirable because it will ultimately escape into the atmosphere. In conventional SCR systems, ammonia is injected into the reactor chamber in a homogenous mixture with the flue gas throughout the entire cross-sectional area of the reactor chamber. Jet-injector nozzles, for example, may be utilized on the ammonia injection grid to assist in delivery of the ammonia in a homogenous mixture. The injection of a homogenous mixture of ammonia vapor into the SCR chamber actually contributes to the occurrence of ammonia slip.

One instance of when ammonia slip may occur is when too much ammonia is utilized in the reactor chamber. In another instance, ammonia slip occurs due to the uneven, or non-homogeneous, distribution of $NO_x$ concentration levels within the reactor chamber. In other words, at any given time within the reactor chamber, different areas of the chamber may have different $NO_x$ concentration levels. Therefore, when ammonia vapor is evenly injected into the reactor chamber, in areas of the reactor chamber where there are low $NO_x$ concentration or distribution levels, the ammonia vapor passes through mostly un-reacted, causing ammonia slip.

U.S. Pat. No. 5,104,629 to Dreschler discloses a system where ammonia is jet-injected into the intermediate space of a stage of an economizer, where the reducing agent is mixed with low-dust flue gas in the tubes of the economizer. The reducing agent and combustion gas may form a homogenous mixture that passes over catalyst layers downstream of the economizer to effect efficient removal of $NO_x$. Application of the jet-injection and mixing in the economizer tubes does not compensate for velocity mal-distribution, and it only controls ammonia slip emissions to a small degree.

U.S. Pat. No. 5,603,909 to Varner et al. teaches that for optimal performance in an SCR system, uniform flow distribution of ammonia is required and ammonia should be distributed evenly over the flue gas flow cross-section of the boiler. Resulting un-reacted ammonia or ammonia slip passes through the SCR catalyst bed and is collected on the heat exchanger surfaces downstream of the SCR catalyst. The heat exchanger surfaces are periodically washed with water. In this process, ammonia slip is not emitted into the atmosphere, but instead transferred into a liquid solution that requires further processing for disposal. However, the elimination of the occurrence of ammonia slip in the first place is not addressed.

U.S. Pat. No. 4,160,805 to Inaba et al. teaches installing the ammonia injection grid immediately upstream of the SCR catalyst in the temperature field appropriate for the SCR catalyst. The ammonia injection grid is located at a point a little short of the catalyst, in the optimum temperature zone for the catalyst modules. The injection pipes are arranged in a way to uniformly add ammonia to the flue gas. Such an arrangement of the ammonia injection grid does not minimize ammonia slip emissions, primarily due to the occurrence of non-uniform distribution of $NO_x$ concentration levels within the reactor chamber.

U.S. Pat. No. 5,988,115 to Anderson et al. discloses a system and method of injecting ammonia in such a manner that a more uniform mixing of the reactant (ammonia) with the flue gas stream is achieved more rapidly, taking advantage of the dynamics of flowing fields exhibiting rotational motion. Anderson et al. teach that in order to ensure optimal SCR operation, it is necessary that the distribution of the reactant across the flue gas stream be as uniform as possible, typically within +/−15 percent of an average value upon entering the SCR chamber. However, as mentioned above, uniform distribution of the reactant does not entirely alleviate the problems with ammonia slip.

U.S. Pat. No. 5,612,010 to Mansour et al. points out that one serious disadvantage involving the SCR process is the risk of unacceptably high levels of ammonia emissions, i.e., high levels of ammonia slip. Mansour et al. recognized that there are technical limitations with SCR performance caused by $NO_x/NH_3$ stratification, and they teach an improved integrated selective catalytic reduction/selective non-catalytic reduction (SCR/SNCR) process. According to this SCR/SNCR process, the size of the SCR catalyst is determined based on a pre-selected value of $NO_x$ concentration, and ammonia is injected into the SNCR zone when this pre-selected value is exceeded in order to reduce the $NO_x$ absolute value. However, problems related to $NO_x/NH_3$ stratification are not entirely alleviated because the SNCR process generates even greater mal-distribution of the $NO_x$ and $NH_3$ concentrations within the reactor chamber. Although the absolute value of the $NO_x$ concentration is ultimately reduced (in the SNCR process), it requires an oversized SCR catalyst to achieve the required performance, as well as installation of an SNCR zone, which is not efficient and has a high capital cost.

Although the prior art has provided SCR system arrangements that are effective for high reduction of $NO_x$ concentrations in flue gas, there are problems with implementing control of $NO_x$ emissions without emission of unreacted ammonia. The main problem with the simultaneous control of $NO_x$ and $NH_3$ emissions steams from the inability to adjust the ammonia concentration profile to the $NO_x$ concentration profile at the face of the SCR catalyst. Disparities between the ammonia concentration profile or the $NO_x$ concentration profile lead to reduced $NO_x$ efficiency (in the case of insufficient ammonia supply) or to emissions of unreacted ammonia (in the case of oversupply of ammonia). This problem is compounded by the fact that the $NO_x$ concentration profile is highly non-uniform across the catalyst face and changes with different operating parameters. Moreover, even with homogenous ammonia vapor injection, the problem of ammonia slip still occurs.

In conventional arrangements of the SCR process, ammonia is injected into the flue gas via an ammonia injection grid (AIG) that is typically equipped with multiple injection points. The flow through each injection point is adjusted during the start-up of the SCR system. Such tuning of the grid or setting of the ammonia flow control valve positions is typically performed when operating the boiler at full load. After the valve positions are set, there is no possibility of readjusting the valves without repeating the manual tuning of the grid. The system is considered properly adjusted when 5 to 10 percent of maldistribution between $NO_x$ and ammonia exists. However, even with the proper adjustments, maldistribution of $NO_x$ and ammonia still exists, which leads to the occurrence of ammonia slip and the escape of unreacted $NO_x$ into the atmosphere.

FIG. 1A illustrates a profile of inlet nitrogen oxide levels within a chamber just upstream from SCR catalyst modules. In a typical SCR system, the levels of nitrogen oxide within a chamber of the SCR system are not homogeneous. Different sections or regions within the area of the chamber have different nitrogen oxide levels, measured in parts-per-million corrected (ppmc) to 3% oxygen (in the case of a boiler, it is corrected to 3% oxygen, but in the case of a turbine, it is corrected to 15% oxygen). FIG. 1A illustrates that the $NO_x$ concentration was highly maldistributed between 95 to 130 ppmc. The profile of FIG. 1A was obtained from a SCR system running at 310 megawatts (MW) with a 93% $NO_x$ reduction efficiency. Ammonia slip was recorded at 10.5 ppmc.

Similarly, as illustrated in FIG. 1B, in which the SCR system was running at a higher load, increased to 318 MW, than in FIG. 1A, the inlet levels of nitrogen oxide within the chamber of the SCR system were also not uniform, and were maldistributed across the cross-sectional area within the chamber reaching concentrations between 145 to 165 ppmc. Notably, a change in the load alone alters the nitrogen oxide patterns, which are not uniformly distributed within the SCR system chamber.

The above-described adjustment of the ammonia injection grid (AIG) and corresponding control of the SCR process presents several more problems. For instance, frequently, boilers are operated by burning different fuels for which combustion utilizes different sets of operating conditions. The $NO_x$ concentration profile when burning natural gas may be completely different when operating the same system burning oil, for example. The $NO_x$ concentration profile may significantly change with the changing pattern of burners in service or other combustion control equipment, which may change for different boiler loads. In addition, the $NO_x$ concentration changes continuously due to fuel quantity, boiler loads, and ambient conditions. The adjustment of ammonia injection is static and pre-established for a particular set of operating parameters, and it is impractical or even impossible to manually change the positions of the valves with continuously changing operating parameters of the boiler.

Accordingly, there is a need for an ammonia distribution grid that provides better control of the adjustment and distribution of ammonia injection, reduces the occurrence of ammonia slip, provides a better operating window, minimizes blockage by ammonia salts, reduces the start-up times of the SCR process, and continuously matches the changing $NO_x$ concentration profile with an ammonia concentration profile throughout the duct.

BRIEF DESCRIPTION OF THE DRAWINGS

FIG. 2A illustrates a plan view of an ammonia distribution grid according to an embodiment of the present invention;

FIG. 2B illustrates an elevational view of an ammonia distribution grid according to an embodiment of the present invention;

DETAILED DESCRIPTION

Figure 1A:
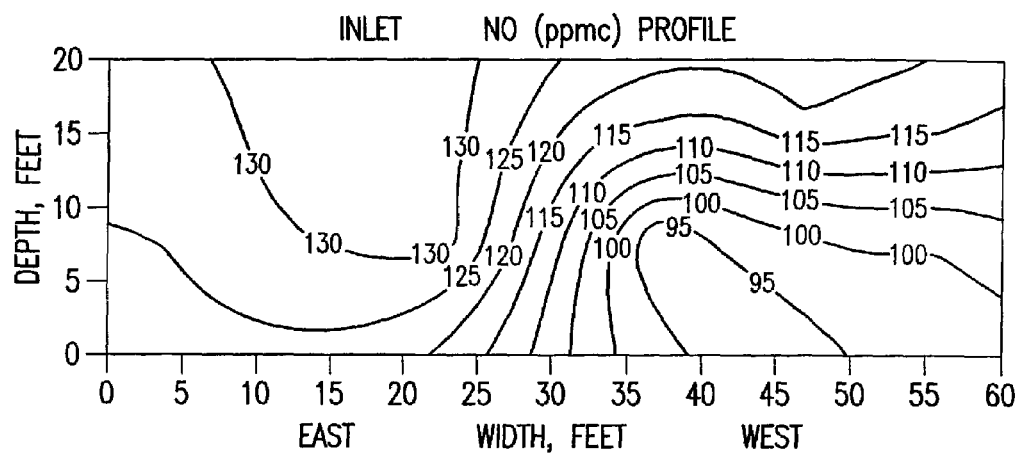
FIGS. 1A and 1B illustrate sample inlet nitrogen oxide levels within a cross-sectional area of a chamber of a conventional selective catalytic reduction (SCR) system.
Figure 1B:
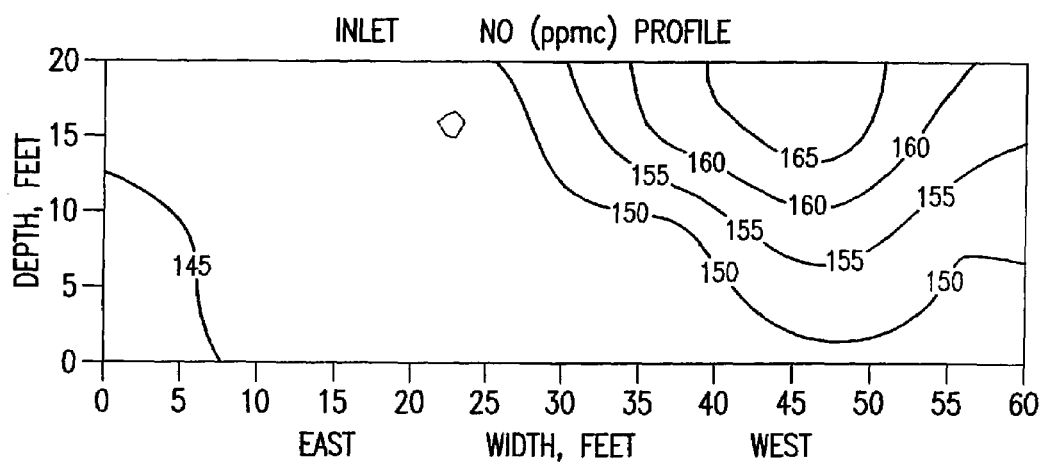
Figure 1C:
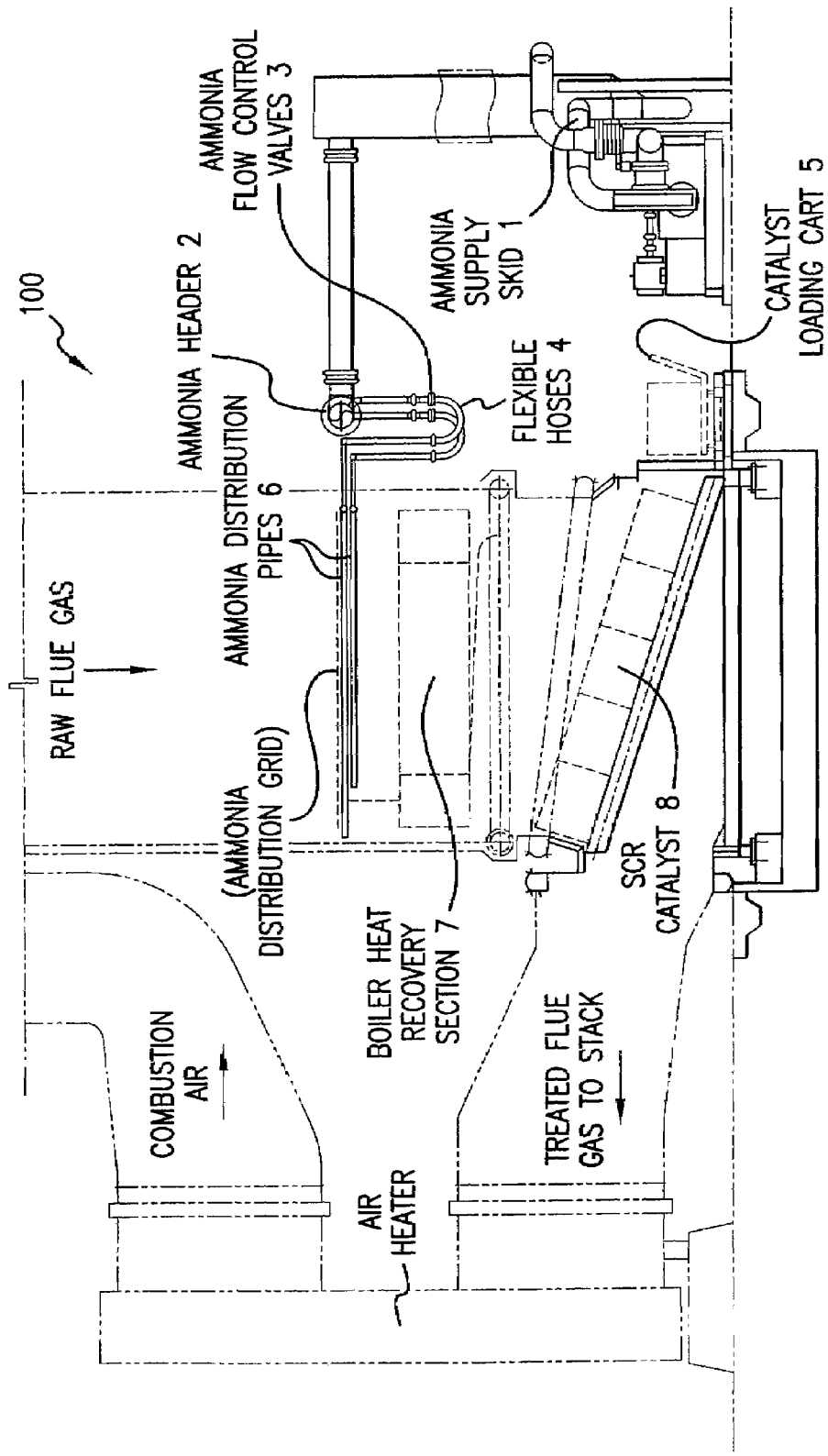
FIG. 1C illustrates a selective catalytic reduction (SCR) system according to an embodiment of the present invention.

FIG. 1C illustrates a selective catalytic reduction (SCR) system according to an embodiment of the present invention. The SCR system 100 includes an ammonia supply skid 1, an ammonia header 2, flow control valves 3, flexible hoses 4, a catalyst loading cart 5, ammonia distribution pipes 6, a boiler heat recovery section 7, and SCR catalyst modules 8. The ammonia is supplied to the skid 1 from the storage where is vaporized and then transferred to the ammonia distribution pipes 6. The ammonia distribution pipes 6 may be connected to flexible hoses 4, which in turn are connected to flow control valves 3, which control the ammonia flow to the ammonia distribution pipes 6 and are connected to the ammonia header 2. The boiler heat recovery section 7 is a high temperature zone of the SCR system where the temperatures are higher than, for example, that of where the SCR catalyst modules 8 reside. Utilization of the SCR catalyst reactors 8 is limited to approximately 800 degrees Fahrenheit, because above this temperature, the SCR catalyst material would sinter and consequently reduce their efficiency. It should be noted that there are also SCR catalysts developed for SCR systems not equipped with heat recovery sections. Such catalysts are capable of withstanding temperatures up to 1,000 degrees Fahrenheit. The catalyst loading cart 5 assists in loading and removal of the SCR catalyst reactors 8 from the chamber.

Raw flue gas containing nitrogen oxide enters (downwards in the example illustrated in FIG. 1C) the catalytic reactor chamber of the SCR system 100. Ammonia is distributed into the chamber from the ammonia distribution pipes 6. The ammonia mixes with the raw flue gas, and reacts with nitrogen oxides over the SCR catalyst modules 8 located downstream, forms nitrogen gas (N2) and water ($H_2O$) as byproducts. The treated flue gas then flows out to the air heater and the stacks, which ultimately flows into the atmosphere. An orifice(s) (not shown) may be provided within the SCR system chamber to measure the velocity and/or concentration levels of the ammonia flow.

FIG. 2A illustrates a plan view of an ammonia distribution grid according to an embodiment of the present invention. A header 2 is connected to a tee 220, which is in fluid communication with the ammonia supply skid 1, to provide ammonia vapors to the ammonia distribution pipes 6 (see FIG. 2B) connected to the headers 2. In one embodiment, the ammonia distribution pipes 6 are preferably formed along a cross-sectional area of the catalytic reactor chamber. According to an embodiment of the present invention, the cross-sectional area of the ammonia distribution pipes 6 forming an ammonia distribution grid is divided up into individual sections. A section among the cross-sectional area of the chamber may be an area corresponding to just one hole in the ammonia distribution pipes 6 forming the ammonia distribution grid.

The ammonia distribution pipes 6 each include a plurality of holes 250 to distribute the ammonia into the catalytic reactor chamber. The level of ammonia flow from the holes 250 of the ammonia distribution pipes 6 throughout the individual sections of the cross-sectional area covered by the ammonia distribution grid may be adjusted based on the real-time ammonia or nitrogen oxide levels within the different sections of the chamber. An ammonia flow pressure drop indicator (not shown) may also be provided within the SCR system to measure ammonia flow rates in each of the sections of the cross-sectional area of the chamber.

Figure 2C:
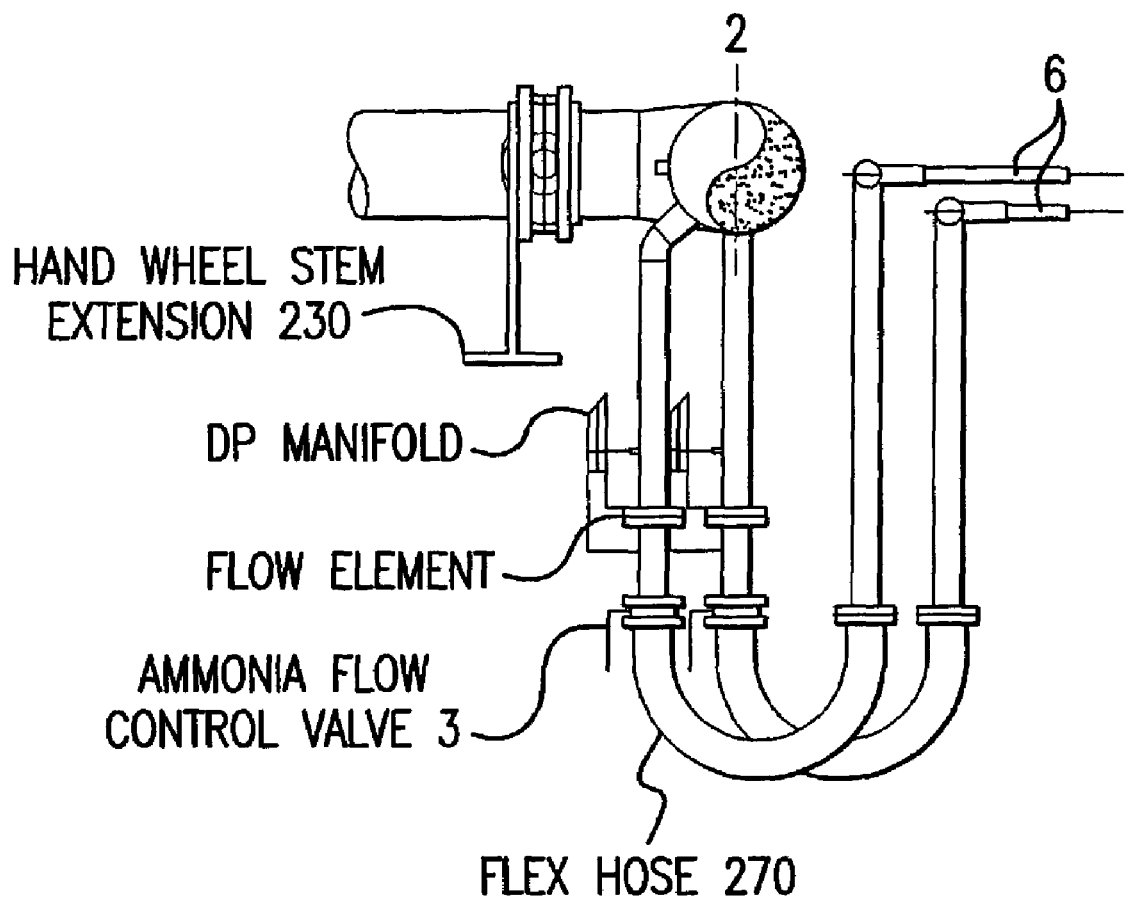
FIG. 2C illustrates a sectional view of an ammonia distribution grid according to an embodiment of the present invention.

Referring to FIG. 2C, the ammonia distribution pipes 6 may be connected to flexible hoses 270, or any suitable connector, which are then connected to pipes leading to the header 2. The header 2 may include a hand wheel 230 (see also FIG. 2A) that acts as a master shut-off of ammonia to the ammonia distribution pipes 6. Control valves 3 may be provided to control ammonia flow individually for each ammonia distribution pipe 6.

Figure 3:
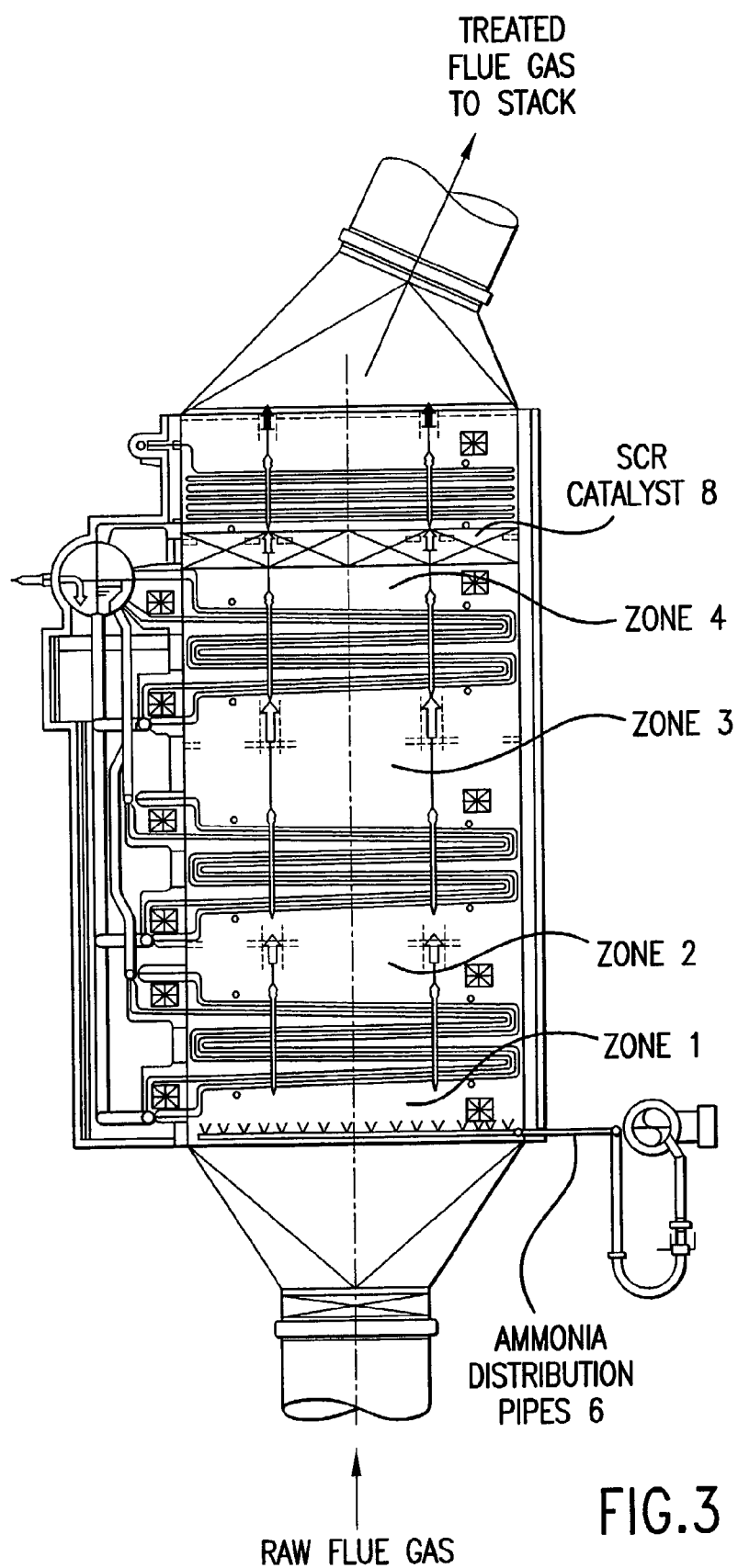
FIG. 3 illustrates a catalytic reactor chamber of a selective catalytic reduction (SCR) system according to an embodiment of the present invention.

FIG. 3 illustrates a catalytic reactor chamber of a selective catalytic reduction (SCR) system according to an embodiment of the present invention. There are four (4) temperature zones illustrated in FIG. 3: Zone 1, Zone 2, Zone 3, and Zone 4. According to an embodiment of the present invention, the SCR catalyst 8 is located in Zone 4, and the ammonia distribution pipes 6 are positioned in Zone 1. The temperature at Zone 1 is greater than that of the temperature at Zone 4. The ammonia distribution pipes 6 are located at a high temperature zone, such as at Zone 1, because higher temperatures minimize the formation of ammonium salts and salt deposits during partial load operations, and especially when the boiler or turbine is operated below 50% of the maximum load.

Ammonium salts and salt deposits do not form at any meaningful rates above the temperature of approximately 500 degrees Fahrenheit. However, during partial load operations and when the boiler or turbine is operated below 50% of the maximum load, the flue gas temperatures entering the SCR reactor chamber are low enough to facilitate reaction between ammonia ($NH_3$), sulfur tri-oxide ($SO_3$), and water ($H_2O$) to form ammonium sulfate ($NH_4)_2SO_4$ and ammonium bisulfate $NH_4HSO_4$. At temperatures less than 400 degrees Fahrenheit, very low concentrations of ammonia and sulfur tri-oxide (in a few parts-per-million (ppm)) is all that is required for the reaction to proceed to form ammonium sulfate and ammonium bisulfate. Ammonium bisulfate is a sticky substance that deposits onto ammonia injection ports and equipment located downstream of the ammonia injection grid. The deposits can cause blockage of the ammonia injection ports, causing malfunction of the injection grid operation, as well as causing problems with operating equipment located downstream of the ammonia distribution grid. These problems are particularly apparent during power plant start-ups and shutdowns when flue gas temperatures entering the catalyst chamber are below 400 degrees Fahrenheit.

Although the SCR catalyst 8 is typically limited to a temperature of no greater than 800 degrees Fahrenheit, ammonia distribution is not limited to this temperature restriction and may be introduced into the SCR system successfully in the range of 800 to 1,300 degrees Fahrenheit and above. Accordingly, by separating the zones for the ammonia grid 6 and the SCR catalyst 8 and locating the ammonia distribution pipes 6 at a high temperature zone, it is possible to reduce the amount of ammonium salts and salt deposits at where the grid is located, especially during partial load operation of the SCR system (where temperatures at the location of the SCR catalyst are typically below 400 degrees Fahrenheit). As a result of the zone separation, ammonia flow may be initiated earlier, as soon as temperatures at the ammonia distribution grid 6 exceed approximately 500 degrees Fahrenheit (or lower, depending on $SO_3$ concentrations in the flue gas). As mentioned above, at such temperatures, the formation of ammonia salts is very limited and grid operation is fully preserved by eliminating the possibility of injection hole blockage. As a result, the ammonia distribution pattern may be maintained at low boiler operating temperatures. At the same time, when the grid temperature reaches approximately 500 degrees Fahrenheit, the flue gas temperatures downstream of the ammonia distribution grid 6 (downstream of the heat recovery sections) are lower. At these lower temperatures, ammonia salts are generated. However, because the ammonia distribution pattern is preserved and the reactions for ammonium bisulfate and sulfate production are reversible with increases in flue gas temperatures (boiler loads), the ammonia salts decompose into the original reactants. Consequently, by separating the operational zones for the ammonia distribution grid 6 and the SCR catalyst 8, it is possible to shorten the start-up times for SCR installation, thus allowing an additional reduction of the $NO_x$ emissions during start-up of the boiler and an increase in the operating window of the SCR process, especially at low boiler loads when the flue gas temperature is below 500 degrees Fahrenheit.

Figure 4:
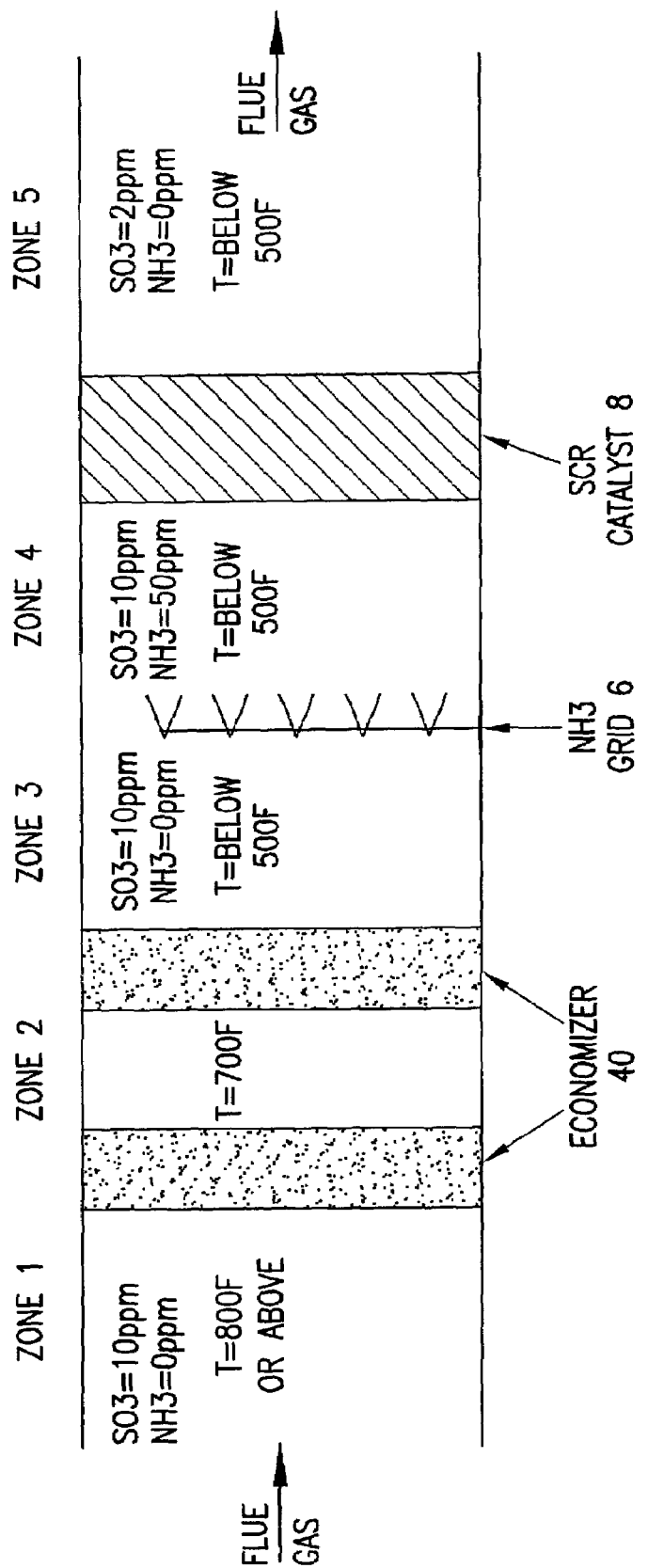
FIG. 4 illustrates a conventional arrangement of an ammonia injection grid according to the prior art.

Referring to FIG. 4, in the conventional arrangement of the ammonia injection grid as in the prior art, the ammonia injection grid 6 is placed immediately "upstream" from the SCR catalyst. However, the temperature in this area (Zone 4) is generally below 500 degrees Fahrenheit at partial loads, and ammonium salts and salt deposits still form at noticeable rates causing possible blockage of the ammonia injection holes.

Figure 5:
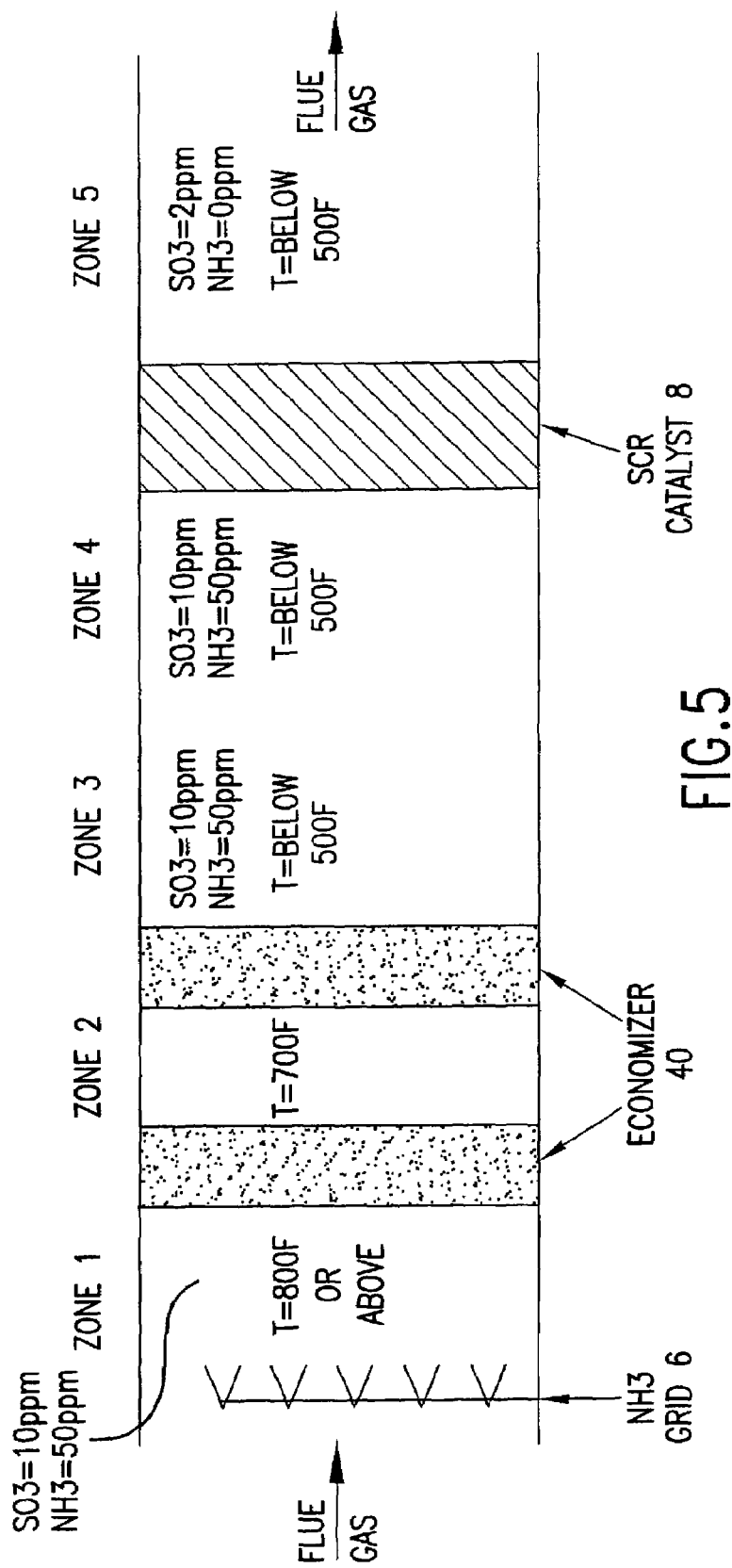
FIG. 5 illustrates an arrangement of an ammonia distribution grid within a catalytic reactor chamber of a selective catalytic reduction (SCR) system according to an embodiment of the present invention.

According to an embodiment of the present invention as illustrated in FIG. 5, the ammonia distribution grid 6 is placed in the high temperature zone (Zone 1) of the reactor chamber, where temperatures average above 800 degrees Fahrenheit during normal operation. At this location and temperature, ammonium salts and salt deposits do not form at any meaningful rates. Therefore, there is no need to provide holes larger than ³⁄₁₆ inches on the ammonia distribution pipes 6. With smaller holes, more holes may be placed along the ammonia distribution pipes 6, and better distribution "resolution" and control of ammonia may be obtained. Furthermore, by utilizing smaller holes, separate jet injectors are not required as the smaller holes naturally distribute the ammonia adequately without the use of additional components such as jet injectors.

Figure 6:
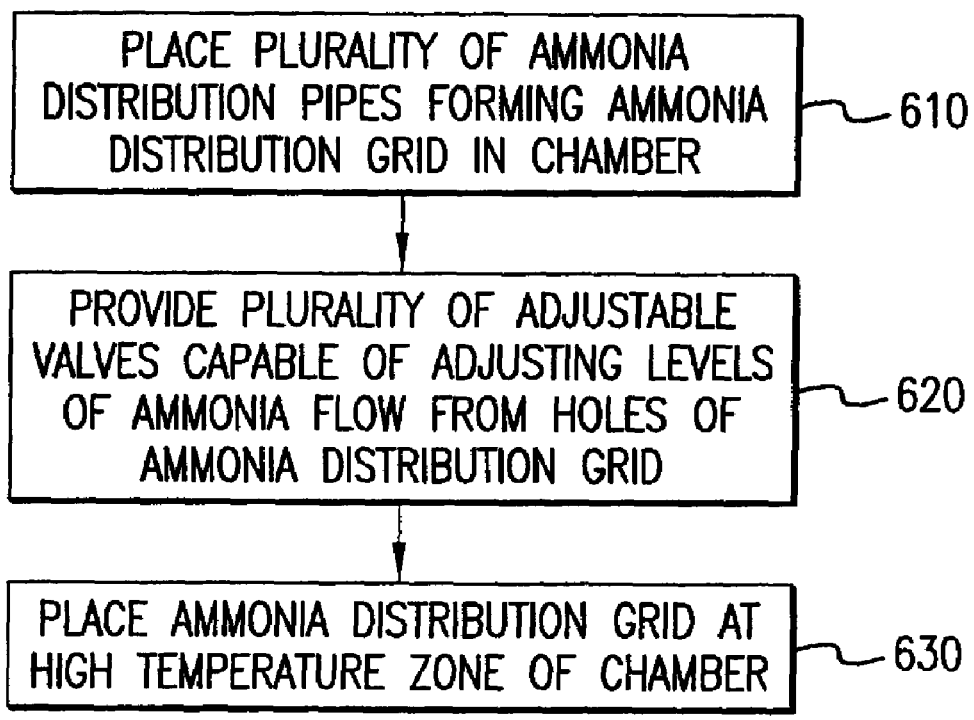
FIG. 6 illustrates a flow chart of providing an ammonia distribution grid according to an embodiment of the present invention.

FIG. 6 illustrates a flow chart of providing an ammonia distribution grid according to an embodiment of the present invention. A plurality of ammonia distribution pipes 6 are placed 610 in a chamber of a SCR system 100 forming an ammonia distribution grid. A plurality of adjustable valves 3 are provided 620, each capable of adjusting levels of ammonia flow from holes of the ammonia distribution grid. The adjustable valves 3 may be configured to control and adjust ammonia flow from different sections of the ammonia distribution grid, or on a hole-by-hole basis. The ammonia distribution grid is placed 630 at a high temperature zone of the chamber, where temperatures average above 800 degrees Fahrenheit during normal operation. At this location and temperature, ammonium salts and salt deposits do not form at any meaningful rates.

Figure 7:
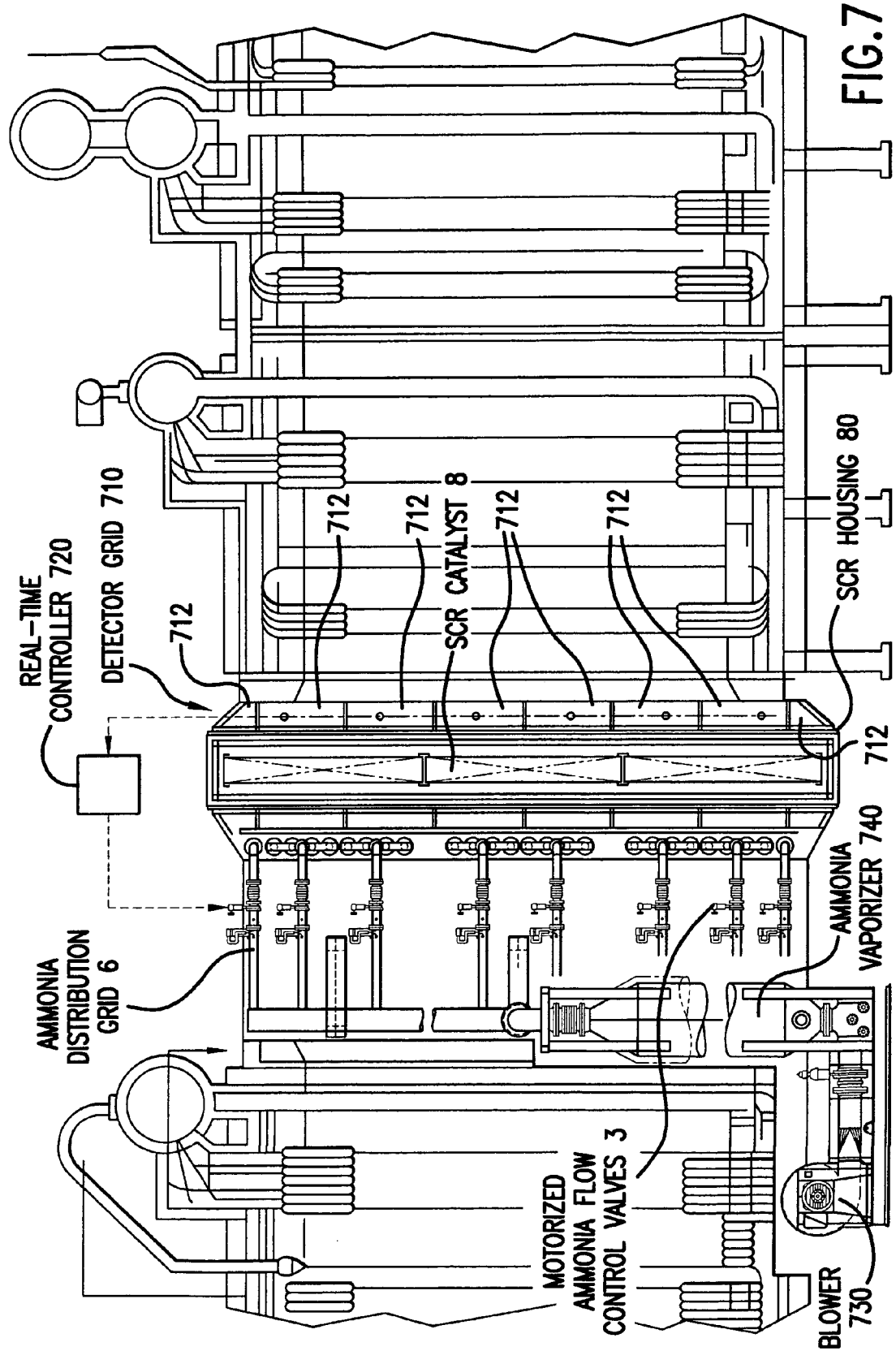
FIG. 7 illustrates a selective catalytic reduction (SCR) system according to an embodiment of the present invention.
Figure 8:
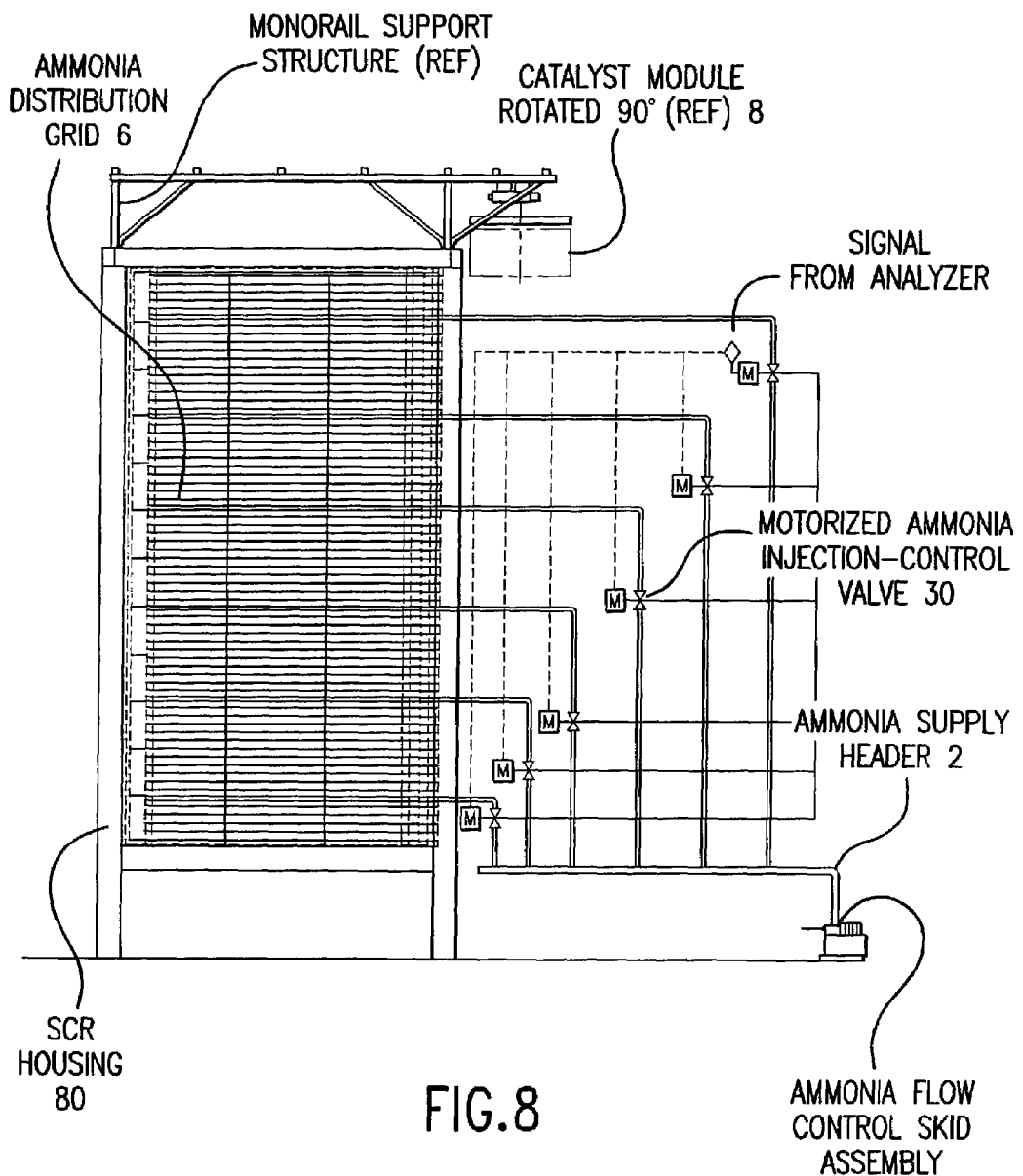
FIG. 8 illustrates an ammonia distribution grid within a chamber of a selective catalytic reduction (SCR) system according to an embodiment of the present invention.

FIG. 7 illustrates a selective catalytic reduction (SCR) system according to an embodiment of the present invention. Similar to the system illustrated in FIG. 1, the SCR system 700 of FIG. 7 includes an ammonia distribution grid formed of ammonia distribution pipes 6. One or more SCR catalyst modules 8 may be housed within a SCR housing 80. Referring to FIG. 8, an ammonia vapor supply skid 1 coupled to an ammonia header 2, like in the SCR system 100 illustrated in FIG. 1, supplies ammonia to the ammonia distribution grid 6. The ammonia distribution grid 6 is preferably formed along a cross-sectional area of the chamber of the SCR system 700 (see FIG. 7) at an upstream end of the SCR catalyst module(s) 8. The ammonia distribution grid 6 may be divided into sections as well, corresponding to the sections of the cross-sectional area. As stated above, a section may be an area corresponding to just one hole in the ammonia distribution pipes 6 forming the ammonia distribution grid, or a greater area, such as one-square-meter sections within the cross-sectional area of the chamber.

A blower 730 as shown in FIG. 7 may be included to provide air or re-circulated flue gas into an ammonia vaporizer 740, which ultimately delivers the vaporized ammonia to the ammonia distribution grid 6. Ammonia flow control valves 3, which are preferably motorized, are provided to regulate the ammonia flow from the ammonia distribution grid 6. The ammonia flow control valves 3, in addition to being motorized, may also be solenoid-type valves, hydraulic-type (air/oil pressure driven) valves, or any other suitable type that may be configured for automated control. The ammonia flow control valves 3 are each capable of adjusting levels of ammonia flow from the holes of the ammonia distribution grid 6. The ammonia flow control valves 3 may be configured to control ammonia flow from different sections of the ammonia distribution grid 6 corresponding to the sections of the cross-sectional area of the chamber or duct of the SCR system, or on a hole-by-hole basis.

A detector grid 710, such as an ammonia detector and/or a nitrogen oxide detector, is located downstream of the SCR catalyst module(s) 8, to detect ammonia levels and/or nitrogen oxide levels. The detector grid 710 may be formed along a cross-sectional area of the chamber at the downstream end of the SCR catalyst module(s) 8 and is capable of detecting ammonia levels and/or nitrogen oxide levels within each of the sections 712 of the cross-sectional area (which may correspond to the sections of the ammonia distribution grid 6) at the downstream end of the SCR catalyst module(s) 8. In the preferred embodiment of the present invention, the detector grid 710 is capable of detecting both ammonia and nitrogen oxide levels, but, the detector grid 710 may be configured to detect just one of an ammonia level or a nitrogen oxide level as well. Moreover, according to alternative embodiments of the present invention, the detector grid 710 may also be configured to detect temperatures and flue gas flow levels within each of the sections of the cross-sectional area of the SCR chamber.

A controller 720 in communication with the detector grid 710 and the ammonia flow control valves 3 is provided to receive real-time data regarding the ammonia levels and/or the nitrogen oxide levels detected by the detector grid 710. The controller 720 controls the ammonia flow control valves 3 based on the ammonia levels and/or the nitrogen oxide levels detected by the detector grid 710. According to one embodiment of the present invention, the controller 720 increases the ammonia flow in any one of the sections where the nitrogen oxide level detected exceeds a predetermined nitrogen oxide level (i.e., in the case where not enough ammonia was utilized to react with the nitrogen oxide). The controller 720 decreases the ammonia flow in any one of the sections where the ammonia level detected exceeds a predetermined ammonia level (i.e., in the case of ammonia slip, where too much ammonia was utilized to react with the nitrogen oxide). According to alternative embodiments of the present invention, the controller 720 may further regulate the ammonia flow based on the temperatures and flue gas flow levels detected within each of the sections of the cross-sectional area of the SCR chamber.

The controller 720 may be a computer system running software programmed to receive signals from the detector grid 710 and to provide control signals to the ammonia flow control valves 3 to regulate ammonia flow. The software executing on the controller 720 preferably includes data relating to acceptable levels of nitrogen oxide and/or ammonia emissions for each of the sections within the SCR chamber. The software may also include data relating to the amount of ammonia flow required to be distributed in each of the sections within the SCR chamber to obtain the acceptable or predetermined levels of nitrogen oxide and/or ammonia emissions from the SCR system.

In alternative embodiments of the present invention, the detector grid 710 may provide digital or analog signals relating to the nitrogen oxide and/or ammonia concentration/distribution levels for each section within the SCR chamber. In the case of analog signals, the controller 720 includes an analog-to-digital converter to convert the received analog signals into digital signals that may be interpreted by the controller 720. The controller 720 in turn performs the computations via the software program and provides digital control signals, or analog control signals passed through a digital-to-analog converter (DAC), to the ammonia flow control valves 3. In the case of the detector grid 710 providing digital signals to the controller 720, the digital signals correspond to different voltage values representing the levels of nitrogen oxide and/or ammonia detected.

Referring to FIGS. 1A and 1B, in a typical SCR system, the levels of nitrogen oxide within a chamber of the SCR system are not homogeneous. Different sections or regions within the area of the chamber have different nitrogen oxide levels. FIG. 1A illustrates that the $NO_x$ concentration was highly maldistributed between 95 to 130 ppmc. Similarly, as illustrated in FIG. 1B, in which the SCR system was running at a higher load, increased to 318 MW, than in FIG. 1A, the inlet levels of nitrogen oxide within the chamber of the SCR system were also not uniform, and were maldistributed across the cross-sectional area within the chamber reaching concentrations between 145 to 165 ppmc. Accordingly in prior art SCR systems, the nitrogen oxide emission profiles also have correspondingly maldistributed nitrogen oxide levels due to the use of a homogenous mixture of ammonia throughout the chamber.

Although increasing the ammonia flow entirely to completely eliminate nitrogen oxide emissions is possible, due to the maldistribution of nitrogen oxide levels, sections where there are lower nitrogen oxide levels would result in ammonia slip, which is unacceptable. Ammonia slip emissions allowances are regulated by law, not to mention that ammonia slip also has an adverse environmental effect. Therefore, conventional SCR systems do not efficiently treat nitrogen oxide emissions while operating within the legal ammonia slip emission tolerances.

Figure 9:
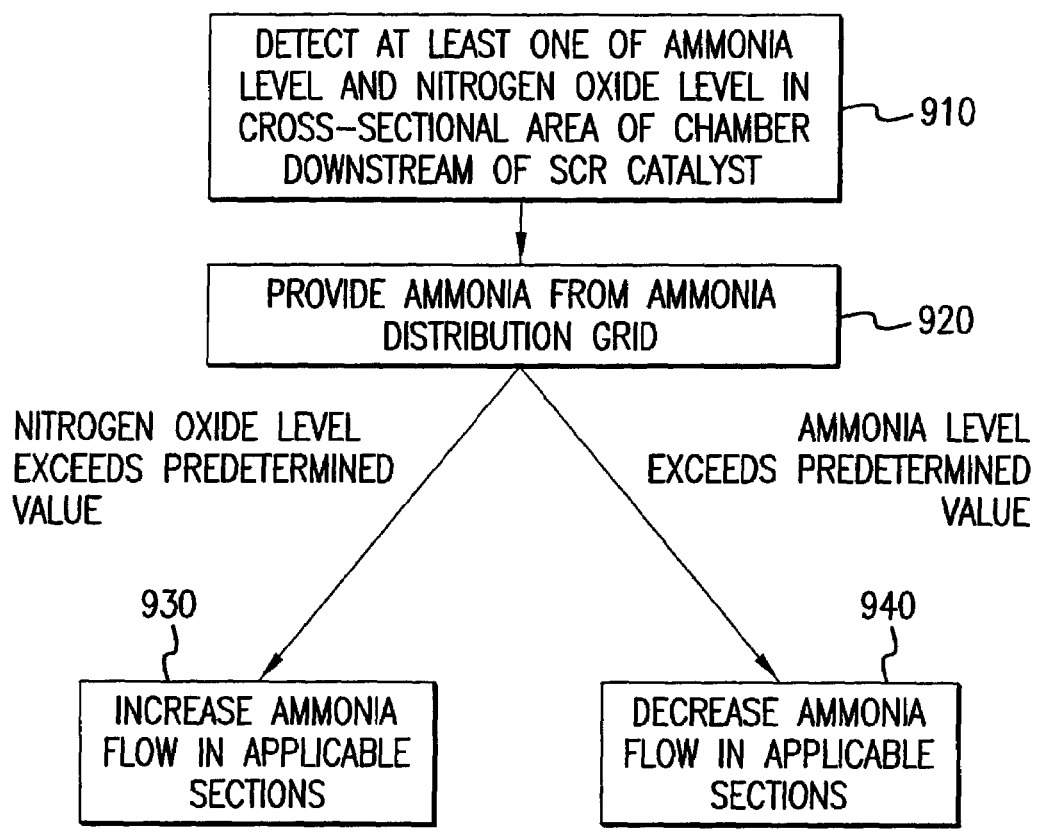
FIG. 9 illustrates a flow chart of operating a selective catalytic reduction (SCR) system according to an embodiment of the present invention.

FIG. 9 illustrates a flow chart of operating a selective catalytic reduction (SCR) system according to an embodiment of the present invention. The SCR system according to embodiments of the present invention maximizes the performance of a SCR system while operating within environmental and legal requirements. The detector grid 710 detects 910 at least one of an ammonia level and a nitrogen oxide level within a cross-sectional area of a chamber within the SCR system at a downstream end of a SCR catalyst module (s) 8. In a preferred embodiment of the present invention, the detector grid 710 is an ammonia detector grid and a nitrogen oxide detector grid. However, alternative embodiments of the present invention may utilize a detector grid 710 that is solely an ammonia detector grid, or solely a nitrogen oxide detector grid. In addition, separate or combined detector grids may be utilized to detect flue gas flow rate and temperature.

According to a preferred embodiment of the present invention, the cross-sectional area within the chamber or duct of the SCR system is divided up into a plurality of sections 712 and the detector grid 710 detects 910 at least one of an ammonia level and a nitrogen oxide level within each of the sections 712. The sections 712 may be of any resolution, that is, each section 712 may constitute a one-square-foot area, or larger or smaller, depending on the arrangement of the holes on the ammonia distribution grid and the degree of control provided by the controller 720 acting on the ammonia flow control valves 3. Accordingly, the higher the resolution, that is, the smaller the section 712, the greater the accuracy of the overall system in treating nitrogen oxide emissions and minimizing ammonia slip. Based on the ammonia level and/or the nitrogen oxide level detected by the detector grid 710, the controller 720 controls the ammonia flow control valves 3 to provide and regulate 920 the flow of different amounts of ammonia from the ammonia distribution grid 6 to each of the sections 712.

According to an embodiment of the present invention, if the detector grid 710 detects that the nitrogen oxide level in any one of the sections exceeds a predetermined nitrogen oxide level (which may be set to zero or a value that has been calculated to be acceptable for that section), the controller 720 controls the ammonia flow control valves 3 to increase 930 the ammonia flow in the applicable sections (to decrease the nitrogen oxide concentrations in any one of the applicable sections). According to an embodiment of the present invention, if the detector grid 710 detects that the ammonia level in any one of the sections exceeds a predetermined ammonia level (which may be zero or a value that has been calculated to be acceptable for that section), the controller 720 controls the ammonia flow control valves 3 to decrease 940 the ammonia flow in the applicable sections (to reduce ammonia slip in any one of the applicable sections). According to a preferred embodiment of the present invention, the detector grid 710 is configured to detect both ammonia and nitrogen oxide levels. By utilizing the SCR system according to embodiments of the present invention, the nitrogen oxide levels across sections within the chamber of the SCR system may be reacted with the appropriate amounts of ammonia distributed from the ammonia distribution grid based on real-time data to ensure that nitrogen oxide emissions are reduced across the entire cross-sectional area of the chamber of the SCR system, while at the same time minimizing the occurrence of ammonia slip.

Real-time control of the distribution of ammonia in a SCR system is particularly beneficial because several variables exist in the operation of a SCR system that reduce the efficiency of conventional SCR systems. In one instance, the start-up and the shut-down processes of a SCR system each create different nitrogen oxide patterns as compared to normal operation. Conventional SCR systems utilize pre-configured settings for ammonia distribution that do not take into account the actual and real-time nitrogen oxide levels within the chamber. Often times, a pre-configured setting is established based only on normal full-load operation, and this pre-configured setting is utilized during both start-up and shut-down processes, for which it is not optimized. Moreover, conventional SCR systems utilize manually-operated ammonia flow control valves, which are not capable of continuously responding to real-time conditions.

It was found that up to 50% additional catalyst is required for SCR systems to achieve 90% $NO_x$ reduction efficiency with only 10% maldistribution. Air quality regulations have become more stringent, and it is common in many jurisdictions to require SCR systems to achieve 90% or greater $NO_x$ reduction efficiency. Therefore, conventional SCR systems that utilize pre-configured settings with manually-adjusted ammonia flow control valves, which are usually adjusted to satisfy full combustion load operating conditions, are not utilized optimally and require additional catalyst volume in order to achieve the required $NO_x$ reduction efficiency level.

Another variable that exists in the operation of a SCR system is that of the load amount and the type of fuel utilized. For example, the types of fuel (e.g., oil, coal, natural gas, etc.) utilized and the load amounts utilized each create different nitrogen oxide concentration patterns, as well as different gas velocities and temperatures. Each of these different variables changes the result of the nitrogen oxide concentration pattern, and the inability of conventional SCR systems to deal with the maldistribution of nitrogen oxide levels results in higher operational costs (e.g., having to deal with increased ammonia being injected, and pressure drops resulting from use of additional catalyst volume), and capital costs (e.g., additional catalyst volume required to compensate for ammonia/nitrogen oxide maldistribution).

According to yet another embodiment of the present invention, the SCR system may utilize a controller having stored therein instructions for controlling the adjustable ammonia flow control valves to predetermined valve positions (valve set points). In other words, the controller may include a set of predetermined valve positions for each different mode of boiler operation. In this SCR system, the nitrogen oxide distributions are determined for each mode of operation, and then the valve set points are set accordingly to the nitrogen oxide distribution determined and stored within the controller. Therefore, based on the mode of boiler operation, the controller sets the valve set points for the adjustable ammonia flow control valves corresponding to the particular mode of boiler operation and adjusts the ammonia flow control valves as the modes of operation change.

The SCR system according to embodiments of the present invention provide better control of the adjustment and distribution of ammonia, reduces the occurrence of ammonia slip, is more economical to operate, is more efficient and environmentally friendly, and reduces the start-up times of the SCR process. The nitrogen oxide emissions resulting from embodiments of the present invention generate nitrogen oxide profiles having zero, negligible, or very low concentrations throughout the entire cross-sectional area downstream from the SCR catalyst modules. Accordingly, a zero ammonia slip SCR system is obtained by matching the nitrogen oxide concentration profile with the ammonia concentration profile.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of operating a selective catalytic reduction (SCR) system, comprising:
   detecting at least one of an ammonia level or a nitrogen oxide level in at least one downstream section within a downstream cross-sectional area of a chamber at a downstream end of a SCR catalyst, wherein the downstream cross-sectional area is divided into a plurality of downstream sections; and
   automatically regulating flow of ammonia from an ammonia distribution grid at an upstream end of the SCR catalyst based on at least one of the ammonia level or the nitrogen oxide level detected.

2. The method according to claim 1, wherein ammonia flow from the ammonia distribution grid is increased in a section corresponding geometrically to the at least one downstream section where the nitrogen oxide level detected exceeds a predetermined nitrogen oxide level.

3. The method according to claim 1, wherein ammonia flow from the ammonia distribution grid is decreased in a section corresponding geometrically to the at least one downstream section where the ammonia level detected exceeds a predetermined ammonia level.

4. The method according to claim 2, wherein the ammonia flow is increased in an amount determined to reduce the nitrogen oxide level.

5. The method according to claim 3, wherein the ammonia flow is decreased in an amount determined to reduce the ammonia level.

6. The method according to claim 1, wherein regulating includes use of ammonia flow control valves coupled to the ammonia distribution grid.

7. The method according to claim 1, wherein nitrogen oxide includes nitric oxide (NO) and nitrogen dioxide ($NO_2$).

8. The method according to claim 1, further including:
   detecting at least one of a temperature and a flue gas flow level within the downstream cross-sectional area of the chamber at the downstream end of the SCR catalyst; and
   automatically regulating the flow of ammonia from the ammonia distribution grid at the upstream end of the SCR catalyst based on at least one of the temperature or the flue gas flow level detected.

9. A method of operating a selective catalytic reduction (SCR) system, comprising:
   detecting at least one of an ammonia level or a nitrogen oxide level in at least one downstream section within a downstream cross-sectional area of a chamber at a downstream end of a SCR catalyst, wherein the downstream cross-sectional area is divided into a plurality of downstream sections; and
   automatically regulating flow of ammonia from an ammonia distribution grid, formed along the cross-sectional area of the chamber at an upstream end of the SCR catalyst, based on at least one of the ammonia level or the nitrogen oxide level detected, wherein ammonia flow from the ammonia distribution grid is increased in a distribution grid section corresponding geometrically to the downstream section where the nitrogen oxide level detected exceeds a predetermined nitrogen oxide level, and ammonia flow from the ammonia distribution grid is decreased in a distribution grid section corresponding to the downstream section where the ammonia level detected exceeds a predetermined ammonia level.

10. The method according to claim 9, wherein ammonia flow from the ammonia distribution grid is increased in the section where the nitrogen oxide level detected exceeds a predetermined nitrogen oxide level.

11. The method according to claim 9, wherein ammonia flow from the ammonia distribution grid is decreased in the section where the ammonia level detected exceeds a predetermined ammonia level.

12. The method according to claim 10, wherein the ammonia flow is increased in an amount determined to reduce the nitrogen oxide level.

13. The method according to claim 11, wherein the ammonia flow is decreased in an amount determined to reduce the ammonia level.

14. The method according to claim 9, wherein regulating includes use of ammonia flow control valves coupled to the ammonia distribution grid.

15. The method according to claim 9, wherein nitrogen oxide includes nitric oxide (NO) and nitrogen dioxide ($NO_2$).

16. The method according to claim 9, further including:
   detecting at least one of a temperature or a flue gas flow level within the downstream cross-sectional area of the chamber at the downstream end of the SCR catalyst; and
   automatically regulating the flow of ammonia from the ammonia distribution grid at the upstream end of the SCR catalyst based on at least one of the temperature or the flue gas flow level detected.

17. A method of operating a selective catalytic reduction (SCR) system, comprising:
   detecting at least one of an ammonia level or a nitrogen oxide level in at least one downstream section within a downstream cross-sectional area of a chamber at a downstream end of a 5CR catalyst, wherein the downstream cross-sectional area is divided into a plurality of downstream sections; and
   automatically regulating flow of ammonia from an ammonia distribution grid, formed along an upstream cross-sectional area of the chamber at an upstream end of the SCR catalyst, the upstream cross-sectional area being divided into a plurality of upstream sections, wherein ammonia flow is increased in an upstream section of the ammonia distribution grid corresponding geometrically to the downstream section where the nitrogen oxide level detected exceeds a predetermined nitrogen oxide level, and the ammonia flow is decreased in an upstream section where the ammonia level detected exceeds a predetermined ammonia level.

18. The method according to claim 17, wherein the ammonia flow is increased in an amount determined to reduce the nitrogen oxide level.

19. The method according to claim 17, wherein the ammonia flow is decreased in an amount determined to reduce the ammonia level.

20. The method according to claim 17, wherein regulating includes use of ammonia flow control valves coupled to the ammonia distribution grid.

21. The method according to claim 17, wherein nitrogen oxide includes nitric oxide (NO) and nitrogen dioxide ($NO_2$).

22. The method according to claim 17, further including:

detecting at least one of a temperature or a flue gas flow level within the cross-sectional area of the chamber at the downstream end of the SCR catalyst; and automatically regulating the flow of ammonia from the ammonia distribution grid at the upstream end of the SCR catalyst based on at least one of the temperature or the flue gas flow level detected.

* * * * *